United States Patent

Meacham

[15] 3,643,024

[45] Feb. 15, 1972

[54] METHOD AND APPARATUS FOR VERTICAL LOCK 2:1 INTERLACE SYNC

[72] Inventor: James H. Meacham, Laurel, Md.

[73] Assignee: Westinghouse Electric Corporation, Pittsburgh, Pa.

[22] Filed: Jan. 30, 1970

[21] Appl. No.: 7,153

[52] U.S. Cl. ............................178/69.5 G, 330/21, 328/187

[51] Int. Cl. ............................H04n 5/06

[58] Field of Search ................178/69.5 G, 69.5 TV; 331/20, 331/21, 113, 145; 328/63, 2, 179, 187, 269

[56] References Cited

UNITED STATES PATENTS 3,359,367 12/1967 Hiatt........................................328/63

3,112,364 11/1963 Myles................................178/69.5 G 3,526,716 9/1970 Brun.................................178/69.5 G

*Primary Examiner*—Benedict V. Safourek

*Assistant Examiner*—Richard P. Lange

*Attorney*—F. H. Henson, C. F. Renz and M. P. Lynch

[57] ABSTRACT

A technique for establishing the interlace of horizontal scanning lines in a video information transmission system based on a vertical lock 2:1 interlace technique which offsets alternate horizontal sync pulse trains by half the horizontal period.

5 Claims, 3 Drawing Figures

WITNESSES:
Bernard R. Gieguey
James F. Young

INVENTOR
James H. Meacham
BY Michael P. Lynch
ATTORNEY

METHOD AND APPARATUS FOR VERTICAL LOCK 2:1 INTERLACE SYNC

BACKGROUND OF THE INVENTION

In the transmission of video information, pulses are required to synchronize and trigger the horizontal and vertical scanning functions in both the imaging and readout devices. In order to reduce readout flicker and increase resolution, conventional systems interlace the horizontal scanning lines.

Interlace scanning is a scanning process in which the distance from center to center of successively scanned lines is two or more times the normal line width so that adjacent lines belong to different fields. In U.S. television, double interlace is used, wherein the 525 lines which comprise one frame are scanned in a first field of 262.5 alternate lines and the remaining 262.5 lines are scanned in a second field.

Derivation of the synchronizing pulses required to achieve an interlace of the horizontal scan lines in video systems has been a complex and expensive endeavor. The standard procedure for developing the desired sync and blank pulse trains have required an extremely stable oscillator operated at twice the horizontal frequency and numerous binary countdown and reset functions to derive the vertical drive signals by means of frequency division.

SUMMARY OF THE INVENTION

A vertical lock technique is established which is utilized to produce interlaced horizontal pulse trains triggered in relation to the frequency of an AC power line.

A logic circuit including a horizontal multivibrator circuit that is reset by the vertical trigger pulse, develops alternate horizontal pulse trains offset by $$H-F/2$$

where $H$ is the horizontal period and $F$ is the horizontal blanking time.

DESCRIPTION OF THE PREFERRED EMBODIMENT

Figure 1:
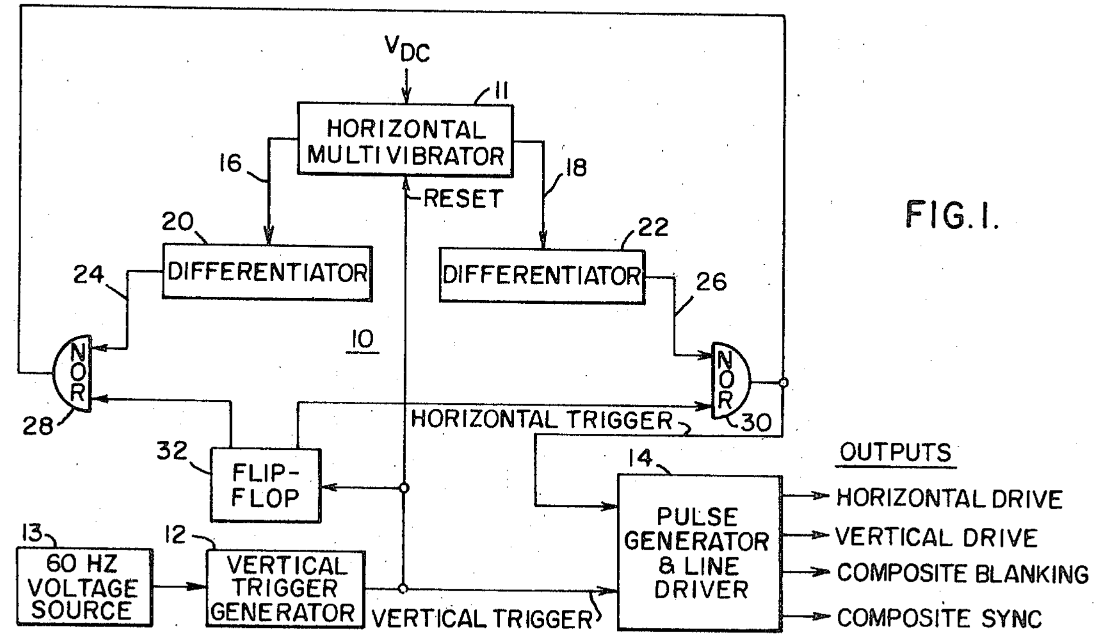
FIG. 1 is a schematic block diagram of an embodiment of the invention.

Referring to FIG. 1 there is illustrated schematically in functional block form a horizontal pulse circuit 10 which generates alternate, time displaced horizontal pulse trains in time relationship with the output pulses produced by a vertical trigger pulse generator 12 in response to a 60 Hz. AC voltage source 13. The output pulses of the horizontal pulse circuit 10 and the vertical trigger pulse generator 12 supply horizontal and vertical trigger pulses respectively to a pulse generator and line driver circuit 14. The pulse generator and line driver 14, which provides synchronization and control outputs identified as Horizontal Drive, Vertical Drive, Composite Blanking and Composite Sync, can be implemented by numerous well known circuits utilized in the television art including the Westinghouse Electric pulse generator and line driver, type 7705.

The following terms of the television art are defined to promote a clear understanding of the invention.

Horizontal Sweep Frequency or Period - Rate at which horizontal scanning lines are initiated.

Vertical Sweep Frequency or Period - Rate at which the sweep of vertical scan lines is initiated.

Horizontal Flyback Time - Time required for the scanning beam to return to its initial horizontal or vertical position after completion of its scan.

Blanking Time - Time during which the scanning beam is cut off while achieving flyback.

Active Time - Horizontal or vertical sweep period minus respective blank time.

Field - One of the equal parts into which a frame is divided in interlaced scanning for television. A field includes one vertical scan. In the present U.S. television broadcasting system there are two fields per frame, with each field taking one-sixtieth of a second and including 262.5 lines.

Horizontal and Vertical Triggers - Digital logic necessary to obtain proper relationship between horizontal and vertical sweep functions.

| | |
|---|---|
| Horizontal drive<br>Vertical drive<br>Composite blank output<br>Composite sync output | Necessary television system pulse trains sequenced by the incoming trigger pulses. |

Figure 2:
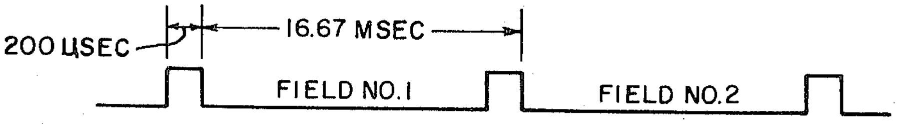
FIGS. 2 and 3 are waveform illustrations of the operation of the embodiment of FIG. 1.
Figure 3:
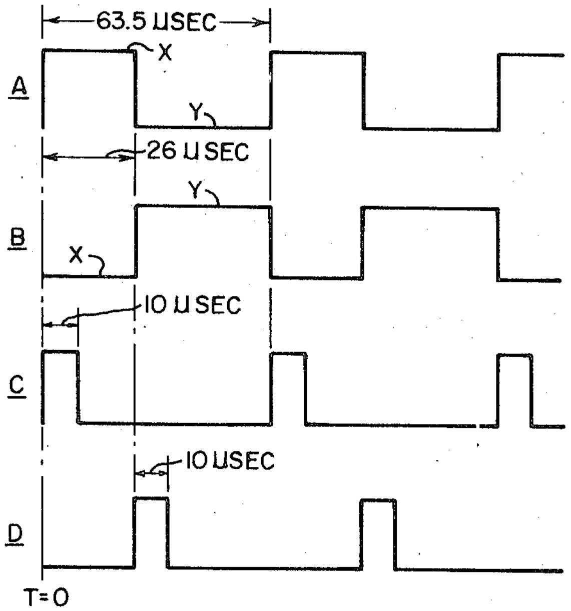

While the conventional 525 line television system is selected for the discussion of the embodiment illustrated in FIGS. 1, 2 and 3, it is significant to note that any desired horizontal frequency may be used.

In the 525 line per frame, or 262.5 line per field systems in which each field takes one-sixtieth of a second or 16.67 milliseconds, the horizontal scan lines occur every 63.5 microseconds.

The horizontal multivibrator circuit 11 of FIG. 1, which functionally can be referred to as a free-running multivibrator, is adjusted to generate a first unsymmetrical square wave pulse train on line 16, illustrated as waveform A of FIG. 3. The period for the pulses of waveform A is 63.5 microseconds. The pulse train transmitted on line 16 is comprised of $X$ segments, the duration of which is represented by the formula $X=H-F/2$, where $H$ is the horizontal period and F is the horizontal flyback time; and $Y$ segments, the duration of which is represented by the formula $Y=H-X$. A second pulse train, corresponding to the inverse of the pulse train on line 16, is produced on line 18 by the horizontal multivibrator circuit 11.

The pulse trains developed on the lines 16 and 18 by the horizontal multivibrator circuit 11 are applied to horizontal pulse shaper circuits 20 and 22 respectively. The pulse shaper circuits 20 and 22 respond to the pulse inputs from the horizontal multivibrator circuit 11 by shortening the pulses to produce pulse trains in which each pulse corresponds in duration to the horizontal beam blanking. The shaped waveforms corresponding to the output waveforms A and B of the horizontal multivibrator circuit 11 are illustrated as waveforms C and D of FIG. 3 respectively. The approximate value of $X$ corresponding to a horizontal period of 63.5 microseconds and a flyback time of 10 microseconds according to the formula $X=H-F/2$ is $63.5-10/2$ or approximately 26 microseconds. The value of $Y$ for the waveforms A and B of FIG. 3 according to the formula $Y=H-X=63.5-26=37.5$ microseconds. The resultant pulse trains developed on lines 24 and 26 of the pulse shaper circuits 20 and 22 respectively are offset by the factor $H-F/2$, half the active horizontal sweep time. The 10 microsecond horizontal blanking time corresponds to EIA (Electronic Industries Association) standards.

The shortened duration output pulse train developed on line 24 of the horizontal pulse shaper circuit 20 is applied as one input of a dual input logic NOR-circuit 28 whereas the output pulse train developed on line 26 of the horizontal pulse shaper circuit 22 is applied as one input to a second dual input logic NOR-circuit 30. The second inputs of the NOR-circuits 28 and 30 are connected to the outputs of a flip-flop circuit 32. The flip-flop circuit 32 responds to the single pulse output of the vertical trigger pulse generator 12 by alternately gating the logic NOR-circuits 28 and 30. The output of the vertical trigger pulse generator 12, which is illustrated in FIG. 2, in addition to providing the alternate gating of the NOR-circuit 28 and 30, functions as a reset pulse for the horizontal multivibrator circuit 11 to ensure the development of identical pulse trains on lines 16 and 18 for each successive field.

The outputs of the logic NOR-circuits 28 and 30 provide alternate horizontal pulse trains to the pulse generator and line driver 14 to establish the desired interlaced horizontal scanning operation; the alternate horizontal pulse trains corresponding to the dual fields of scan. The output of the vertical trigger pulse generator 12 triggers the vertical flyback at the same time for each field and the $H-F/2$ shift of the pulse trains assures proper interlace. The vertical lock approach eliminates the necessity of readjusting a monitor's vertical integrator to the field shift. The inherent nature of the vertical lock allows differential changes in horizontal frequency between frames to have negligible effect on the monitor interlace.

It is apparent that numerous technique may be utilized to implement the well-known functions defined in block form in FIG. 1. In particular, the use of state of the art integrated circuits would result in a relatively compact circuit package.

Various modifications may be made within the scope of this invention.

I claim:

1. Apparatus for providing interlace of horizontal scan lines of alternately scanned fields in a video system, comprising, in combination, first circuit means including a multivibrator circuit for developing horizontal pulse trains for each field wherein the pulse trains corresponding to alternate fields are offset relative to one another by approximately one-half the active horizontal sweep time of the scanned field, second circuit means for generating vertical trigger pulses at a 60 Hz. frequency and logic circuit means responsive to said vertical trigger pulses for alternately gating the pulse trains corresponding to said alternate fields, said alternately gated pulse trains being combined to form interlaced horizontal trigger pulses, the output of said second circuit means being operatively connected to said multivibrator circuit, each of said vertical trigger pulses functioning to reset said multivibrator circuit.

2. Apparatus as claimed in claim 1 wherein the offset of the horizontal pulse trains corresponding to the alternate fields is represented by the formula $H-F/2$, where $H$ is the horizontal period and $F$ is the horizontal flyback time of the video system.

3. Apparatus as claimed in claim 1 wherein the vertical trigger pulses of said second circuit means are generated in relation to the frequency of an AC power line.

4. Apparatus as claimed in claim 1 wherein said first circuit means includes a free-running multivibrator circuit having an input and a first and second output, said input being operatively connected to said second circuit means, said multivibrator circuit producing a first pulse train at said first output and a second pulse train at said second output in response to the vertical trigger pulses of said second circuit means, said second pulse train being the inverse of said first pulse train, pulse shaper circuit means operatively connected to the first and second outputs of said multivibrator circuit, said pulse shaper circuit means shaping said first and second pulse trains to provide pulses corresponding to the blank duration of the video system and at a frequency corresponding to the horizontal period of the video system, said third circuit means including a first and second logic gate each having a first and second input, said first pulse train being applied to the first input of said first logic gate and said second pulse train being applied to the first input of said logic gate and a flip-flop circuit having a first and second output, said first output being operatively connected to the second input of said first logic gate and said second output being operatively connected to the second input of said second logic gate, said flip-flop circuit responding to vertical trigger pulses by alternately gating said first and second pulse trains through said first and second logic gates respectively, the alternate pulse trains transmitted by said first and second gates representing alternate horizontal sync pulse trains.

5. A method for providing interlace of horizontal scan lines of alternately scanned fields in a video system comprising the steps of, generating alternate horizontal pulse trains for each field by actuating a free-running multivibrator, said pulse trains corresponding to alternate fields are offset relative to one another by approximately one-half the active horizontal sweep time of the scanned field, shaping said pulse trains to provide pulses corresponding to the blank duration of the video system and at a frequency corresponding to the horizontal period of the video system, alternately gating said shaped pulse trains in response to 60 Hz. vertical trigger pulses to produce alternate horizontal trigger pulses and resetting said multivibrator with each of said vertical trigger pulses to provide 60 Hz. locking of the vertical and horizontal trigger pulses.

* * * * *